US012770221B2

(12) United States Patent
Yu et al.

(10) Patent No.: US 12,770,221 B2
(45) Date of Patent: Oct. 20, 2026

(54) METHOD AND DEVICE FOR CORRECTING LIGHTING OF IMAGE

(71) Applicant: SAMSUNG ELECTRONICS CO., LTD., Suwon-si (KR)

(72) Inventors: Junsang Yu, Suwon-si (KR); Kinam Kwon, Suwon-si (KR); Jaehyoung Yoo, Suwon-si (KR); Sangwon Lee, Suwon-si (KR); Hyong Euk Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 507 days.

(21) Appl. No.: 18/300,095

(22) Filed: Apr. 13, 2023

(65) Prior Publication Data

US 2024/0135494 A1 Apr. 25, 2024
US 2024/0233080 A9 Jul. 11, 2024

(30) Foreign Application Priority Data

Oct. 24, 2022 (KR) ........................ 10-2022-0137738

(51) Int. Cl.
*G06T 5/00* (2024.01)
*G06T 5/50* (2006.01)
(Continued)

(52) U.S. Cl.
CPC .................. *G06T 5/00* (2013.01); *G06T 5/50* (2013.01); *G06T 7/0002* (2013.01); *G06T 7/90* (2017.01);
(Continued)

(58) Field of Classification Search
CPC . G06T 5/00; G06T 2207/20081; G06V 10/82; G06N 3/045; G06N 3/08
See application file for complete search history.

(56) References Cited

U.S. PATENT DOCUMENTS

2022/0111960 A1* 4/2022 Tran ......................... B64D 1/18
2022/0122235 A1* 4/2022 Liang ........................ G06T 3/40
(Continued)

FOREIGN PATENT DOCUMENTS

JP 2021-136555 9/2021
JP 2021-180527 11/2021
(Continued)

OTHER PUBLICATIONS

Oh, et al., "Approaching the Computational Color Constancy as a Classification Problem through Deep Learning", arXiv preprint arXiv:1608.07951v1 [cs.CV] Aug. 29, 2016, 13 pages.
(Continued)

*Primary Examiner* — Molly Wilburn
*Assistant Examiner* — Jacqueline R Zak
(74) *Attorney, Agent, or Firm* — F. CHAU & ASSOCIATES, LLC

(57) ABSTRACT

A method, implemented by a processor, of correcting lighting of an image includes inputting an input image to a first neural network and generating predicted lighting data corresponding to lighting of the input image and embedding data corresponding to a feature of the input image, inputting the generated predicted lighting data, the generated embedding data, and sensor data to a second neural network and generating a lighting weight corresponding to the input image, and generating correction lighting data for the input image by applying the generated lighting weight to preset basis lighting data corresponding to the input image.

18 Claims, 10 Drawing Sheets

(51) Int. Cl.
*G06T 7/00* (2017.01)
*G06T 7/90* (2017.01)

(52) U.S. Cl.
CPC ............... *G06T 2207/10024* (2013.01); *G06T 2207/20081* (2013.01); *G06T 2207/20084* (2013.01); *G06T 2207/30168* (2013.01)

(56) References Cited

U.S. PATENT DOCUMENTS

| | | | | |
|---|---|---|---|---|
| 2023/0245382 | A1* | 8/2023 | Gardner | G06T 19/006 345/426 |
| 2023/0401681 | A1* | 12/2023 | Sun | G06T 5/60 |
| 2024/0129446 | A1* | 4/2024 | Qian | H04N 25/135 |
| 2024/0212106 | A1* | 6/2024 | LeGendre | G06T 5/50 |

FOREIGN PATENT DOCUMENTS

| | | |
|---|---|---|
| KR | 10-1992-0015937 | 8/1992 |
| KR | 10-2010-0095232 | 8/2010 |
| KR | 10-2021-0063231 | 6/2021 |
| KR | 10-2021-0144151 | 11/2021 |

OTHER PUBLICATIONS

Bianco, et al., "Color Constancy Using CNNs", arXiv preprint arXiv:1504.04548v1 [cs.CV] Apr. 17, 2015, 9 pages.

Barron, "Convolutional Color Constancy", Computer Vision Foundation, pp. 379-387.

Hu, et al., "FC4: Fully Convolutional Color Constancy with Confidence-weighted Pooling", Computer Vision Foundation, pp. 4085-4094.

* cited by examiner

METHOD AND DEVICE FOR CORRECTING LIGHTING OF IMAGE

CROSS-REFERENCE TO RELATED APPLICATIONS

This application claims priority under 35 USC § 119(a) to Korean Patent Application No. 10-2022-0137738, filed on Oct. 24, 2022, in the Korean Intellectual Property Office, the disclosure of which is incorporated by reference herein in its entirety.

BACKGROUND

The present disclosure relates to a method and device for image processing, and more specifically, for correcting the lighting of an image using neural networks.

White balancing is a process in digital imaging and photography to modify the colors in an image. For example, colors may be corrected to appear natural to the human eye. Cameras may not reproduce colors similar to those perceived by the human visual processing system under different lighting scenarios. The white balance process may be used to remove color cast in the image so that colors are reproduced as they would be perceived, regardless of the lighting conditions in which the image was taken. White balance technology includes statistics-based white balancing and machine learning based white balancing. A statistics-based white balance technique uses statistical features of an image to estimate lighting, such as the average red, green, and blue (RGB) ratios. A machine learning based white balance technique uses a neural network trained with images and corresponding lighting information to estimate lighting.

Machine learning based methods include a convolutional color constancy (CCC) method and a fully convolutional color constancy with confidence-weighted pooling (FC4) method. The CCC method depends on the assumption that lighting is uniform across an entire image. The FC4 method relies on semantic information in local regions and may depend on a large amount of high-quality annotated training data. Accordingly, there is a need in the art for a method of white balancing that does not assume uniform lighting and does not require high-quality annotated training data.

SUMMARY

This Summary introduces a selection of concepts in a simplified form, and does not limit the scope of the claimed subject matter.

In one general aspect, a method is performed by a processor, includes generating, using a first neural network, predicted lighting data corresponding to lighting of an input image and embedding data corresponding to a feature of the input image, generating, using a second neural network, a lighting weight corresponding to the input image based on the predicted lighting data, the embedding data, and sensor data, and generating correction lighting data for the input image by applying the lighting weight to preset basis lighting data corresponding to the input image.

The method may further include generating a white-balanced image by applying the generated correction lighting data to the input image. The generating the correction lighting data for the input image may include calculating a lighting correction vector based on a weighted sum between the basis lighting data and the generated lighting weight, and based on the calculated lighting correction vector, generating correction lighting data for the input image.

The method may further include calculating a total loss, based on training data, including a plurality of losses, and based on the calculated total loss, training the first neural network and the second neural network together. The total loss may include, as the plurality of losses, an estimation loss, a correction loss, a weight loss, and a color loss, in which the estimation loss is related to lighting applied to an image, the correction loss is related to correction of the lighting applied to the image, the weight loss is related to weight sparsity, and the color loss is related to adjustment of a color distribution.

The training the first neural network and the second neural network together may include inputting a training image included in the training data to the first neural network and generating temporary predicted lighting data and temporary embedding data, inputting the generated temporary predicted lighting data, the generated temporary embedding data, and sensor data to the second neural network and generating a temporary lighting weight, generating temporary correction lighting data by applying the generated temporary lighting weight to the preset basis lighting data, and calculating the total loss by using the generated temporary predicted lighting data, the generated temporary lighting weight, and the generated temporary correction lighting data.

The calculating the total loss may include calculating an estimated loss based on the generated temporary predicted lighting data and ground truth lighting data calculated from the training image, calculating a correction loss and a color loss, based on the generated temporary correction lighting data and ground truth correction lighting data mapped to the training image, and calculating a weight loss based on a sum of weights included in the generated temporary lighting weight.

The method may further include retraining the first neural network and the second neural network, and by retraining the first neural network and the second neural network, tuning the correction lighting data for the input image. The tuning the correction lighting data for the input image may include changing the total loss by changing one or more of a correction parameter applied to the correction loss, a weight adjustment parameter applied to the weight loss, and a color distribution adjustment function for calculating the color loss, and based on the changed total loss, retraining the first neural network and the second neural network. The tuning the correction lighting data for the input image may further include retraining the first neural network and the second neural network by changing the ground truth correction lighting data mapped to the training image.

The tuning the correction lighting data for the input image may further include retraining the first neural network and the second neural network by changing the basis lighting data preset corresponding to the input image to other basis lighting data. The method may further include changing at least one weight of a plurality of weights included in the lighting weight generated corresponding to the input image and changing the lighting weight and tuning the correction lighting data for the input image by applying the changed lighting weight to the preset basis lighting data.

The method may further include generating pieces of embedding data respectively corresponding to a plurality of input images, extracting, from the plurality of input images, another input image including embedding data that is similar to the embedding data of the input image, and tuning pieces of correction lighting data respectively corresponding to the first input image and the second input image together.

The tuning the pieces of correction lighting data respectively corresponding to the first input image and the second input image together may include, when retraining the first neural network and the second neural network to tune the correction lighting data of the first input image, inputting the second input image to the retrained first neural network and the retrained second neural network and tuning the correction lighting data of the second input image.

The method may further include, when a color space of an image received from a capturing device changes from a first color space to a second color space, calculating a color correction matrix from a first raw image captured in the first color space and a second raw image captured in the second color space, changing training data by applying the calculated color correction matrix to a training image included in the training data and ground truth correction lighting data mapped to the training image, and retraining the first neural network and the second neural network based on the changed training data.

In another general aspect, an image processing device includes a communicator configured to receive an input image and a processor configured to input the input image to a first neural network and generate predicted lighting data corresponding to lighting of the input image and embedding data corresponding to a feature of the input image, input the generated predicted lighting data, the generated embedding data, and sensor data to a second neural network and generate a lighting weight corresponding to the input image, and generate correction lighting data for the input image by applying the generated lighting weight to basis lighting data preset corresponding to the input image.

The processor may calculate a total loss, based on training data, including a plurality of losses, and based on the calculated total loss, train the first neural network and the second neural network together, in which the total loss includes, as the plurality of losses, an estimation loss, a correction loss, a weight loss, and a color loss, in which the estimation loss is related to lighting applied to an image, the correction loss is related to correction of the lighting applied to the image, the weight loss is related to weight sparsity, and the color loss is related to adjustment of a color distribution.

The processor may retrain the first neural network and the second neural network, and by retraining the first neural network and the second neural network, tune the correction lighting data for the input image. The processor may change the total loss by changing one or more of a correction parameter applied to the correction loss, a weight adjustment parameter applied to the weight loss, and a color distribution adjustment function for calculating the color loss, and based on the changed total loss, retrain the first neural network and the second neural network. The processor may change at least one weight of a plurality of weights included in the lighting weight generated corresponding to the input image and changing the lighting weight and tune the correction lighting data for the input image by applying the changed lighting weight to the preset basis lighting data.

In another general aspect, a method which may be performed by a processor includes encoding an input image using a first neural network to obtain predicted lighting data representing a lighting of the input image and embedding data representing features of the input image other than lighting, generating a plurality of lighting weights using a second neural network based on the predicted lighting data and the embedding data, and generating a modified image based on the input image and the plurality of lighting weights, wherein the modified image has the features of the input image and different lighting from the lighting of the input image.

Other features and aspects will be apparent from the following detailed description, the drawings, and the claims.

Figure 1:
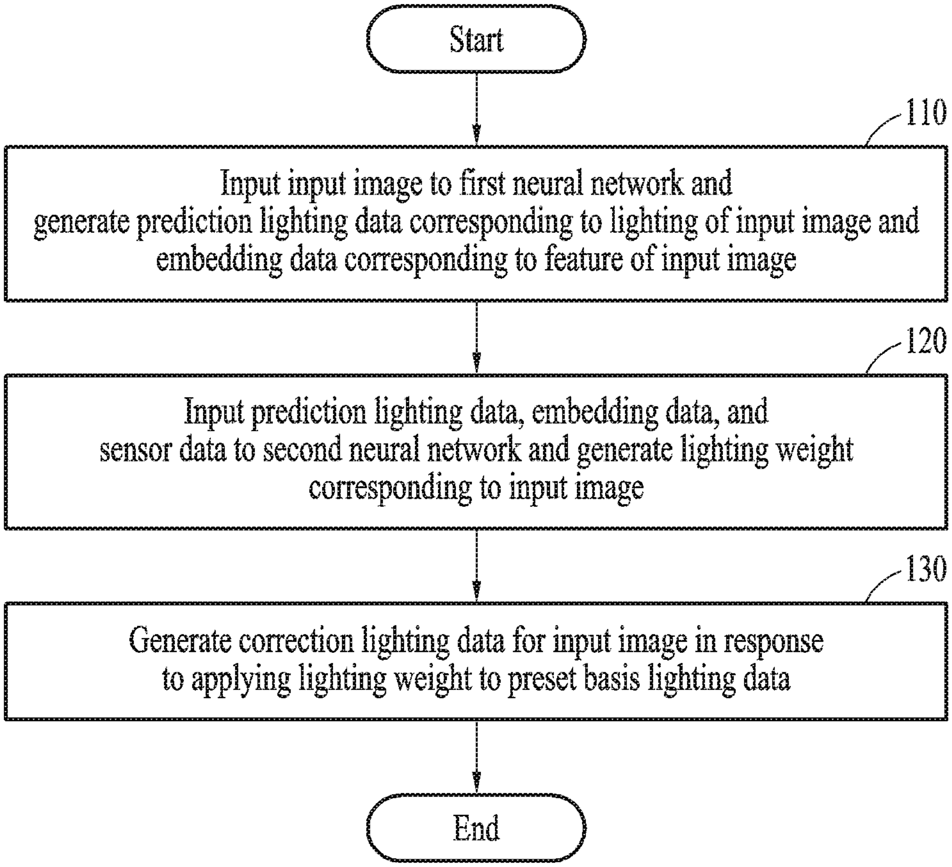
FIG. 1 illustrates an example of a process of generating correction lighting data for an input image by an image processing device.

Throughout the drawings and the description, unless otherwise described or provided, the same drawing reference numerals will refer to the same elements, features, and structures. The drawings may not be to scale, and the relative size, proportions, and depiction of elements in the drawings may be exaggerated for clarity, illustration, and convenience.

DETAILED DESCRIPTION

The present disclosure relates to a method and device for adjusting white balance, and more specifically, for correcting the lighting of an image using neural networks.

When an object is illuminated by light from a light source, the color of an image of the object may be affected by the light because the light can changes the way colors are perceived by a camera or by a human eye. Light sources may emit different amounts of light at different wavelengths of the color spectrum due to different spectral power distributions. When the same object is illuminated by different light sources, it may appear to have different colors. This can result in an inaccurate or undesirable representation of the color of the object in the captured image. White balance technology may be used to correct the color representation. For example, white balance technology may estimate the lighting conditions present when the image was captured and adjust the image to compensate for the effects of the light source, resulting in a more accurate representation of the true colors in the image.

White balance technology includes a statistics-based technique and a machine learning based technique. The statistics-based white balance technique uses statistical features of an image to estimate lighting, such as the average red, green, and blue (RGB) ratios. For example, statistics-based lighting estimation technology may assume that the average RGB ratio of the image should be an achromatic color, which has a RGB ratio of 1:1:1, and corrects the average RGB ratio of the image to 1:1:1. A machine learning based white balance technique uses a neural network trained with images and corresponding lighting information to estimate lighting. However, the statistics-based technique may not always correctly estimate the lighting in the image because it considers the statistical features of the image, and assumes one statistical feature (for example, the average RGB ratio of an image) to be an achromatic color.

Machine learning based white balance techniques include convolutional color constancy (CCC) method and fully convolutional color constancy with confidence-weighted pooling (FC4) method. The CCC method casts a color constancy problem as a classification problem and defines three classification nodes at a last layer of a neural network. The neural network is trained to minimize the angular error between a generated vector of RGB chromaticity related to the lighting of an image and the ground truth lighting. The FC4 method generates a confidence map of the local lighting of an image including three channels using a layer that generates a feature map of four channels, rather than using a classification layer. The final lighting of the image is generated by using a weighted sum method that takes into account the confidence of the local lighting. However, the CCC method assumes that the lighting information is uniform across the entire image, thus cannot handle images with variations in lighting. The FC4 method relies on semantic information in local regions and may require a large amount of high-quality annotated training data.

Accordingly, embodiments of the present disclosure provide an improvement to conventional machine learning based white balance technique by enabling accurate image color correction with neural networks that do not depend on a large amount of annotated training data. Embodiments of the disclosure use a first neural network to generate predicted lighting data corresponding to lighting of the input image and embedding data corresponding to a feature of the input image, use a second neural network to generate a lighting weight corresponding to the input image, and generate correction lighting data for the input image by applying basis lighting data preset corresponding to the input image.

FIG. 1 illustrates an example of a process of generating correction lighting data for an input image by an image processing device. In some examples, the method described by FIG. 1 can be implemented by one or more neural networks operating on an image processing device. For example, the method can be implemented by a computer performing functions related to image color correction and balance tasks in digital cameras, smartphones, webcams, or security cameras, etc.

The method for generating correction lighting data may be performed by a processor in an image processing device based on one or more artificial neural networks (ANNs) including a first neural network and a second neural network. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

In operation 110, the image processing device inputs the input image to a first neural network and generate predicted lighting data corresponding to lighting of the input image and embedding data corresponding to a feature of the input image. The predicted lighting data may be data predicting the lighting applied to the input image and the embedding data may be data extracting the feature of the input image. In some cases, the image processing device may include or be connected to a capturing device for capturing an image. In some cases, the image processing device may include a communicator, and the communicator may receive, from the capturing device, the image captured by the capturing device. The image processing device may input the captured image received from the capturing device to the first neural network.

The predicted lighting data may be represented as a three-dimensional (3D) vector, with the three components representing the red, green, and blue color values of the lighting applied to the image respectively. For example, when the lighting of the input image is white lighting, the predicted lighting data may be expressed as (1, 1, 1).

The embedding data may also be represented as a p-dimensional vector. Here, p may be an integer greater than or equal to 1 and may be determined by a hyperparameter of the first neural network. According to some embodiments, the number of nodes in the output layer of the first neural network may be determined based on the dimensionality (i.e., the number of dimensions) of the embedding data and the predicted lighting data. For example, when the embedding data is represented as a 4D vector, the output layer of the first neural network may have seven nodes, with three nodes respectively corresponding to the three components included in the predicted lighting data and four nodes respectively corresponding to the four components included in the embedding data.

In operation 120, the image processing device inputs, to a second neural network, the predicted lighting data corresponding to the input image, the embedding data corresponding to the input image, and sensor data and may generate a lighting weight corresponding to the input image.

The image processing device may include or be connected to an auxiliary sensor for generating the sensor data. The image processing device may receive the sensor data from the auxiliary sensor. The auxiliary sensor may include, for example, a photoresistor sensor, or an ambient light sensor. The photoresistor sensor may be used to sense ambient brightness. For example, the sensor data may include a lux value of the ambient brightness sensed by the photoresistor. Lux is the unit of measurement for the illuminance (amount of light) on a surface, and it is used to quantify the amount of light incident on a surface, per unit area. In some cases, the ambient light sensor may measure the red, green, and blue light levels present in the ambient light. In some cases, the ambient light sensor may determine the ratios of these RGB levels in the ambient light.

For example, when receiving the sensor data including a lux value, the image processing device may input, to the second neural network, the lux value, the predicted lighting data corresponding to the input image and the embedding data corresponding to the input image and may generate the lighting weight corresponding to the input image. In another example, when receiving the sensor data including the ratio of the red light quantity, the green light quantity, and the blue light quantity included in the ambient light, the image processing device may input, to the second neural network, a 3D vector corresponding to the ratio of the red light quantity, the green light quantity, and the blue light quantity, the predicted lighting data corresponding to the input image, and the embedding data corresponding to the input image. However, embodiments of the present disclosure are not limited to the foregoing examples. The image processing device may input, to the second neural network, the predicted lighting data corresponding to the input image and the embedding data corresponding to the input image, without using the sensor data, and may generate the lighting weight corresponding to the input image.

In an example, the image processing device determines which data to input to the second neural network, and use that data to train the network. For example, the image processing device may determine to input the predicted lighting data and the embedding data to the second neural network, and the second neural network may be trained to output the lighting weight from the predicted lighting data and the embedding data.

The first neural network and/or the second neural network may be implemented through a neural network model. A neural network may be trained based on machine learning and may perform inference suitable for a training purpose by mapping to each other input data and output data that are in a non-linear relationship. A weight corresponding to a neural network model or the structure of the neural network model may be obtained through supervised or unsupervised learning, and through the weight, input data and output data may be mapped to each other.

During the training process, the weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

In some cases, the training is performed in a two-phase process including a first training phase (i.e., the pre-training phase) that is based on or useful for multiple tasks, and a second training phase (i.e., the fine-tuning phase) that is specific to an individual task.

In operation 130, the image processing device generates correction lighting data for the input image by applying the lighting weight corresponding to the input image to basis lighting data preset corresponding to the input image. The correction lighting data may be used for correcting the lighting applied to the input image for white balancing of the input image.

The basis lighting data may include a plurality of vectors, and the lighting weight may be represented as a single vector including a plurality of lighting weight values. In this case, the number of vectors included in the basis lighting data may match the dimensionality (i.e., the number of values) of the corresponding lighting weight vector. For example, when the basis lighting data includes three vectors, the lighting weight may include three components as a 3D vector. The correction lighting data may be represented as a 3D vector. For example, the correction lighting data may include, as components of the 3D vector, a red color value of new lighting applied to an image, a green color value of the new lighting, and a blue color value of the new lighting.

According to an aspect of the disclosure, a method includes encoding an input image using a first neural network to obtain predicted lighting data representing a lighting of the input image and embedding data representing features of the input image other than lighting, generating a plurality of lighting weights using a second neural network based on the predicted lighting data and the embedding data, and generating a modified image based on the input image and the plurality of lighting weights, wherein the modified image has the features of the input image and different lighting from the lighting of the input image. In an example, the image processing device may generate a white-balanced image by applying the correction lighting data for the input image to the input image.

Figure 2:
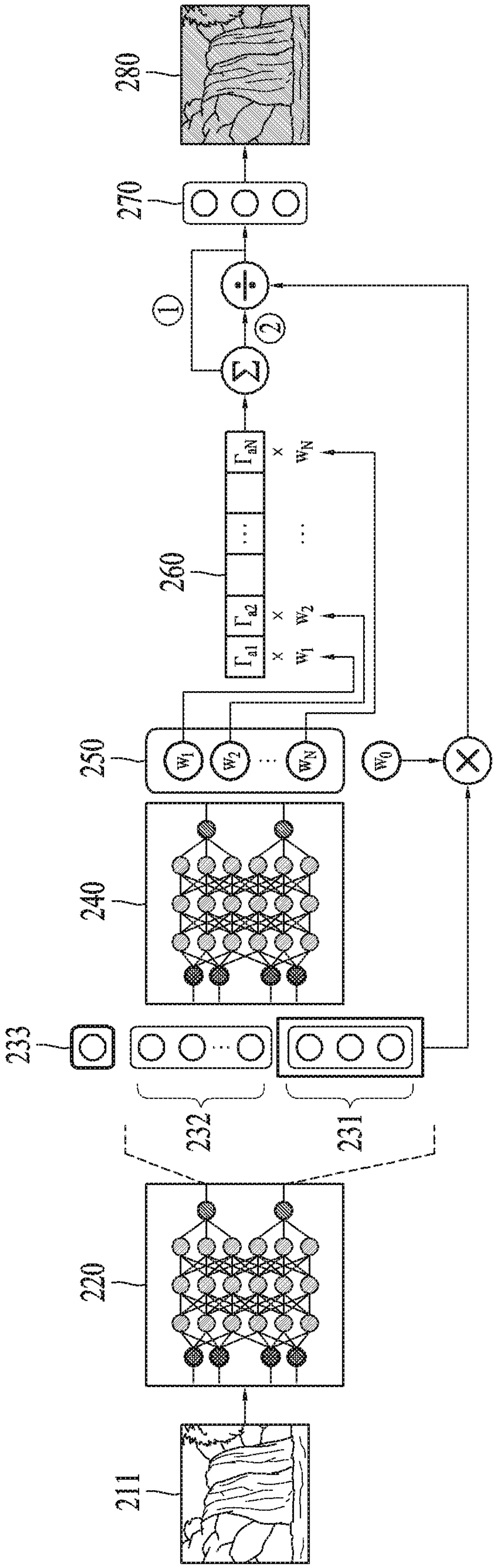
FIG. 2 illustrates an example of generating correction lighting data for an input image.

FIG. 2 illustrates another example of generating correction lighting data for an input image by an image processing device.

In some examples, the first neural network 220 and the second neural network 240 comprise a convolutional neural network (CNN) architecture. A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a pass of the CNN, filters at each layer may be convolved across the input volume, computing the dot product between the filter and the input. During the training process, the filters may be modified so that they activate when they detect a particular feature within the input.

The image processing device may input an input image 211 to a first neural network 220 and generate predicted lighting data 231 corresponding to the input image 211 and embedding data 232 corresponding to the input image 211. The image processing device may input the predicted lighting data 231, the embedding data 232, and sensor data 233 to a second neural network 240 and generate a lighting weight 250 corresponding to the input image 211. The image processing device may generate correction lighting data 270 for the input image 211 by applying the lighting weight 250 to preset basis lighting data 260. The image processing device may generate a white-balanced image 280 by applying the correction lighting data 270 for the input image 211 to the input image 211.

In an example, the basis lighting data 260 may be predetermined data used to correct lighting of an image. In some cases, basis lighting data 260 may depend on the input image. In some embodiments, the image processing device may associate a piece of data among pieces of data as the basis lighting data 260 corresponding to the input image 211.

For example, the basis lighting data 260 may be set based on a color temperature of a light source. The basis lighting data 260 may be a vector indicating a color distribution of light emitted from the light source, and the color distribution of the light emitted from the light source may be determined based on the color temperature of the light source. When the color temperature (e.g., a color temperature of 1000K to 3000K) of the light source is low, a red color component is greater than a blue color component of the color distribution of the light emitted from the light source. When the color temperature (e.g., a color temperature of 6000K to 9000K) of the light source is high, the blue color component is greater than the red color component of the color distribution of the light emitted from the light source. By determining the color temperature of the light source, the image processing device may set the vector indicating the color distribution of the light emitted from the light source to the basis lighting data 260 corresponding to the input image 211.

In another example, the basis lighting data 260 may be set based on the type of a capturing device that has captured the input image 211. The image processing device may preset pieces of basis lighting data respectively for the types of capturing devices. For example, the image processing device may set first basis lighting data for a first-type capturing device and set second basis lighting data for a second-type capturing device. The image processing device may set the basis lighting data 260 corresponding to the input image 211 to a piece of basis lighting data (e.g., the first basis lighting data) corresponding to the type (e.g., the first type) of the capturing device receiving the input image 211. In another example, the basis lighting data 260 may be generated by a machine learning model that is trained to output a piece of basis lighting data from the input image 211.

As described above, the basis lighting data 260 may include n vectors. Here, n may be an integer greater than or equal to 1. For example, referring to FIG. 2, the basis lighting data 260 preset corresponding to the input image 211 may include n vectors, such as $\Gamma_{a1}, \Gamma_{a2}, \ldots, \Gamma_{aN}$. Each of the vectors (e.g., $\Gamma_{a1}, \Gamma_{a2}, \ldots, \Gamma_{aN}$) included in the basis lighting data 260 may be a 3D vector, but examples are not limited thereto.

In an example, the image processing device may generate the correction lighting data 270 for the input image 211 by applying the lighting weight 250 to the basis lighting data 260 preset corresponding to the input image 211.

In an example, the image processing device may generate the correction lighting data 270 for the input image 211 by applying the lighting weight 250 to the basis lighting data 260 preset corresponding to the input image 211. The image processing device may determine a first lighting correction vector $\Gamma_{final1}$ calculated through a weighted sum between the basis lighting data 260 and the lighting weight 250 to be the correction lighting data 270 for the input image 211. In this case, an output layer of the second neural network 240 may include n nodes, and the image processing device may determine the lighting weight 250 based on node values (e.g., $w_1, w_2, \ldots, w_N$) of the n nodes included in the output layer of the second neural network 240. For example, referring to FIG. 2, the lighting weight 250 corresponding to the input image 211 may include an n-dimensional vector of $(w_1, w_2, \ldots, w_N)$. The first lighting correction vector $\Gamma_{final1}$ may be represented by Equation 1.

$$\Gamma_{final1} = \begin{cases} [1, 1, 1]^T & : \text{if } w_1 = w_2 = \ldots = w_N = 0 \\ w_1\Gamma_{a1} + w_2\Gamma_{a2} + w_3\Gamma_{a3} + \ldots + w_N\Gamma_{aN} & : \text{else} \end{cases} \quad \text{[Equation 1]}$$

In another example, the image processing device may generate the correction lighting data 270 by using the predicted lighting data 231 corresponding to the input image 211 in addition to the basis lighting data 260 and the lighting weight 250. For example, the image processing device may calculate a second lighting correction vector $\Gamma_{final2}$ by using the first lighting correction vector $\Gamma_{final1}$ calculated through the weighted sum between the basis lighting data 260 and the lighting weight 250 and a vector $\Gamma_{esti}$ indicating the predicted lighting data 231. In one embodiment, the image processing device may determine the second lighting correction vector $\Gamma_{final2}$ to be the correction lighting data 270. The second lighting correction vector $\Gamma_{final2}$ may be represented by Equation 2.

$$\Gamma_{final2} = N\left(\frac{\Gamma_{final1}}{w_o\Gamma_{esti} + \in}\right) \quad \text{[Equation 2]}$$

In Equation 2, $w_0$ denotes a weight applied to the vector $\Gamma_{esti}$ indicating the predicted lighting data 231 to calculate the second lighting correction vector $\Gamma_{final2}$, $\in$ denotes a constant, and N(•) denotes a normalization function.

According to some embodiments, a second neural network 240, the output layer of which includes n+1 nodes, may be trained and used by the image processing device to determine the second lighting correction vector $\Gamma_{final2}$ to be the correction lighting data 270. When, the output layer of the second neural network 240 may include. The image processing device may determine the lighting weight 250 based on node values (e.g., $w_1, w_2, \ldots, w_N$) of the first n nodes of the n+1 nodes included in the output layer of the second neural network 240 and may determine the weight applied to the vector $\Gamma_{esti}$ based on a node value (e.g., $w_0$) of the remaining 1 node.

Figure 3:
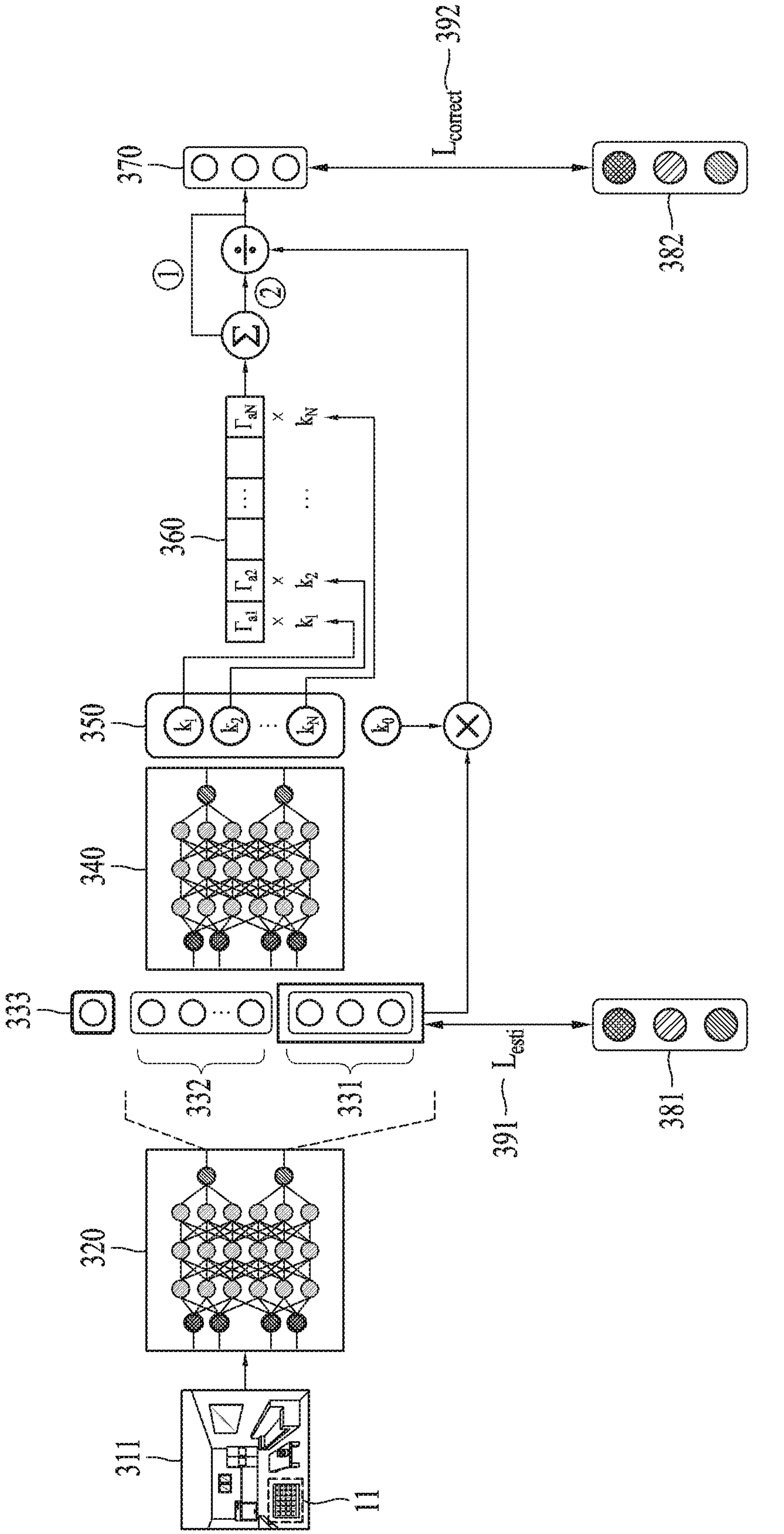
FIG. 3 illustrates an example of training a first neural network and a second neural network.

FIG. 3 illustrates an example of training a first neural network and a second neural network by an image processing device.

In some examples, the first neural network and the second neural network are trained using a supervised learning technique. Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

According to some embodiments, a first neural network 320 and a second neural network 340 may be jointly trained. For example, the first neural network 320 and the second neural network 340 may be trained during a same training phase using a same loss function based on common training data. The term "loss function" refers to a function that impacts how a machine learning model is trained in a supervised learning model. For example, during each training iteration, the output of the model can be compared to known annotation information in the training data. The loss function provides a value (i.e., a "loss") based on how close the predicted data is to the actual annotation data. After computing the loss, parameters of the model are updated accordingly and a new set of predictions are made during the next iteration.

In an example, the first neural network 320 and the second neural network 340 may be jointly trained using a total loss including a plurality of losses. The image processing device may calculate the total loss including the plurality of losses, based on training data including a training image 311, and the first neural network 320 and the second neural network 340 may be jointly trained to minimize the calculated total loss. The image processing device may iteratively update parameters of each of the first neural network 320 and the second neural network 340 until either the total loss converges or the total loss drops below a predefined threshold. For example, the total loss may be represented by Equation 3.

$$L_{tot} = L_{esti} + L_{correct} + L_{weight} + L_{color} \quad \text{[Equation 3]}$$

In Equation 3, $L_{tot}$ denotes the total loss, $L_{esti}$ denotes an estimation loss related to lighting applied to an image, $L_{correct}$ denotes a correction loss related to correction of the lighting applied to the image, $L_{weight}$ denotes a weight loss related to weight sparsity, and $L_{color}$ denotes a color loss related to color distribution adjustment of correction lighting. In other words, the total loss $L_{tot}$ may include, as a plurality of losses, the estimation loss $L_{esti}$, the correction loss $L_{correct}$, the weight loss $L_{weight}$, and the color loss $L_{color}$.

In an example, the image processing device may input the training image 311 included in the training data to the first neural network 320 and generate temporary predicted lighting data 331 and temporary embedding data 332. The image processing device may input the temporary predicted lighting data 331 output from the first neural network 320, the temporary embedding data 332 output from the first neural network 320, and sensor data 333 to the second neural network 340 and generate a temporary lighting weight 350. The image processing device may generate temporary correction lighting data 370 by applying the generated temporary lighting weight 350 to preset basis lighting data 360. The image processing device may calculate the total loss by using the temporary predicted lighting data 331, the temporary lighting weight 350, and the temporary correction lighting data 370.

In an example, the image processing device may calculate an estimation loss 391 based on the temporary predicted lighting data 331 and ground truth predicted lighting data 381. The image processing device may calculate the estimation loss 391 indicating an error between the temporary predicted lighting data 331 predicting lighting applied to the training image 311 and the ground truth predicted lighting data 381 calculated from the training image 311. The estimation loss 391 may be provided by Equation 4.

$$L_{esti}E(\hat{\Gamma}_{esti},\Gamma_{esti,GT}) \quad \text{[Equation 4]}$$

In Equation 4, $L_{esti}$ denotes the estimation loss 391, $\hat{\Gamma}_{esti}$ denotes the temporary predicted lighting data 331, $\Gamma_{esti,GT}$ denotes the ground truth predicted lighting data 381, and E(•) denotes a distance-based loss function. For example, an angular error function may be used as the distance-based loss function E(•).

According to some embodiments, the image processing device may generate the ground truth predicted lighting data 381 of the training image 311 using the color checker 11 included in the image. For example, the image processing device may detect the color of an achromatic patch in the color checker 11 and calculate the lighting data based the color information of the achromatic patch. For example, if the red, green, and blue values of the achromatic patch are detected as 137, 175, and 92 respectively, the vector representing the ground truth predicted lighting data could be (137, 175, 92).

In some cases, the image processing device may mask a region corresponding to the color checker 11 in the training image 311 and input the masked region to the first neural network 320 such that the first neural network 320 may predict lighting of the training image 311 without information on the ground truth predicted lighting data 381 of the training image 311 when inputting the training image 311 to the first neural network 320.

In an example, the image processing device may calculate a correction loss 392 based on the temporary correction lighting data 370 and ground truth correction lighting data 382 preset for the training image 311. The image processing device may calculate the correction loss 392, or the correction loss $L_{correct}$, indicating an error between the temporary correction lighting data 370 and the ground truth correction lighting data 382, that is, ground truth data for correcting the lighting applied to the training image 311. The training data may map the training image 311 and the ground truth correction lighting data 382 corresponding to the training image 311 to each other and include the mapped training image 311 and the mapped ground truth correction lighting data 382. The correction loss $L_{correct}$ may be provided by Equation 5.

$$L_{correct}=\lambda_c E(\hat{\Gamma}_{correct},\Gamma_{correct,GT}) \quad \text{[Equation 5]}$$

In Equation 5, $L_{connect}$ denotes the correction loss 392, $\hat{\Gamma}_{correct}$ denotes temporary correction lighting data 370 generated through the first neural network 320 and the second neural network 340, $\Gamma_{correct,GT}$ denotes the ground truth correction lighting data 382, E(•) denotes the distance-based loss function, and $\lambda_c$ denotes a correction parameter. For example, the proportion of the correction loss $L_{correct}$ in the total loss $L_{tot}$ may be changed based on a change of the correction parameter.

In an example, the image processing device may calculate the weight loss $L_{weight}$ based on a sum of weights included in the temporary lighting weight 350 output from the second neural network 340. The weight loss $L_{weight}$ may be a loss function for adjusting sparsity between weights included in a lighting weight. In this case, the sparsity between the weights may be a degree of the weights spacing apart from one another. The sparsity decreases as the degree of the weights spacing apart from one another increases and the sparsity increases as the degree of the weights spacing apart from one another decreases. The weight loss $L_{weight}$ may be provided by Equation 6.

$$L_{weight}\lambda_s\|w\|_1 \quad \text{[Equation 6]}$$

In Equation 6, $L_{weight}$ denotes a weight loss, $\|w\|_1$ denotes the sum of weights (e.g., $k_1$, $k_2$, . . . , $k_N$) included in the temporary lighting weight 350, and $\lambda_s$ denotes a weight adjustment parameter. For example, the proportion of the weight loss $L_{weight}$ in the total loss $L_{tot}$ may be changed based on a change of the weight adjustment parameter.

In an example, the image processing device may calculate the color loss $L_{color}$ based on the temporary correction lighting data 370 and the ground truth correction lighting data 382. The color loss $L_{color}$ may be a loss function for adjusting a distribution of a certain color when adjusting lighting of an input image. The color loss $L_{color}$ may be provided by Equation 7.

$$L_{color}=L_a(\hat{\Gamma}_{correct},\Gamma_{correct,GT}) \quad \text{[Equation 7]}$$

In Equation 7, $L_{color}$ denotes a color loss, $L_a$ denotes a color distribution adjustment function, $\hat{\Gamma}_{correct}$ denotes the temporary correction lighting data 370 generated through the first neural network 320 and the second neural network 340, and $\Gamma_{correct,GT}$ denotes the ground truth correction lighting data 382.

Figure 4:
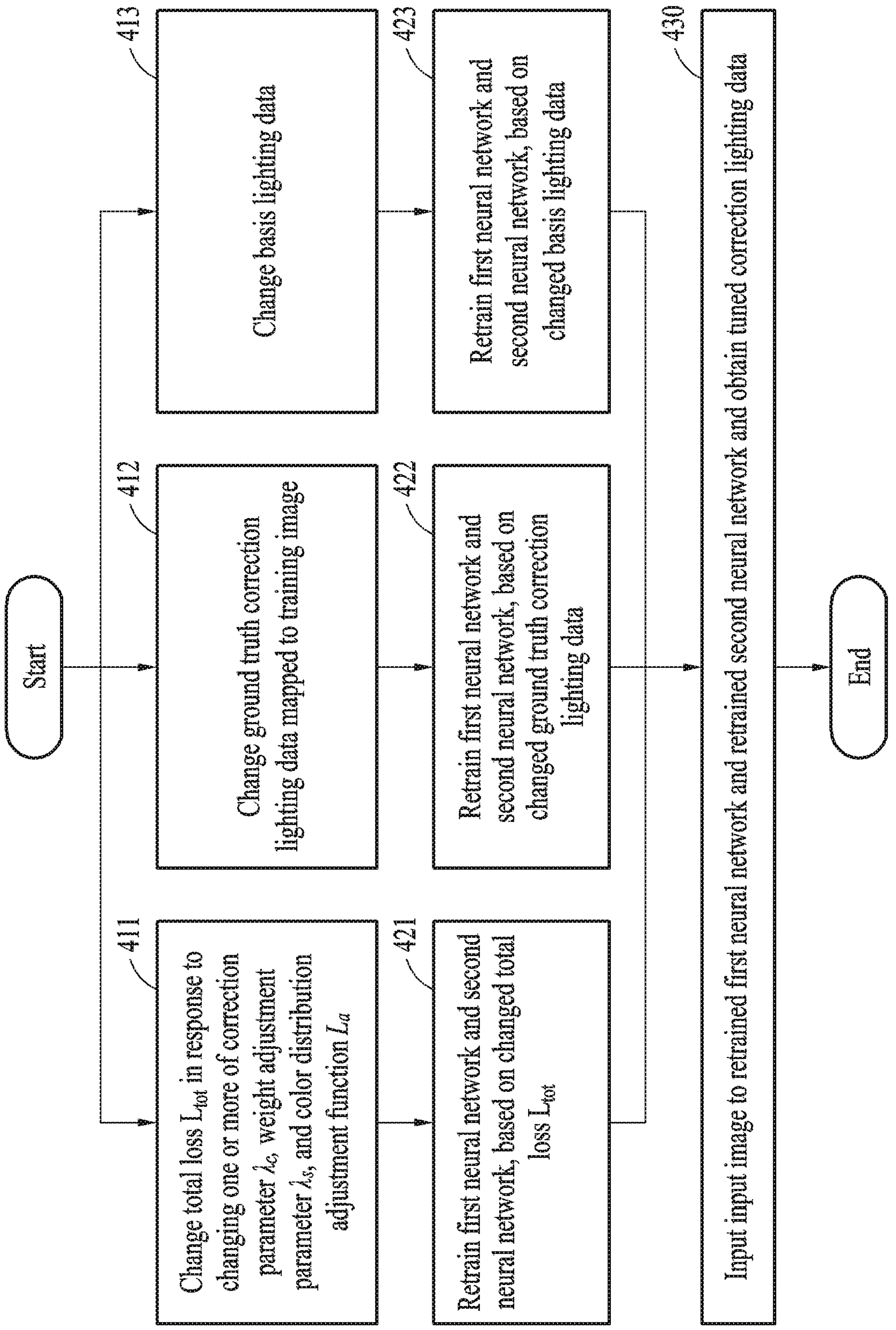
FIGS. 4 and 5 illustrate examples of tuning correction lighting data for an input image.
Figure 5:
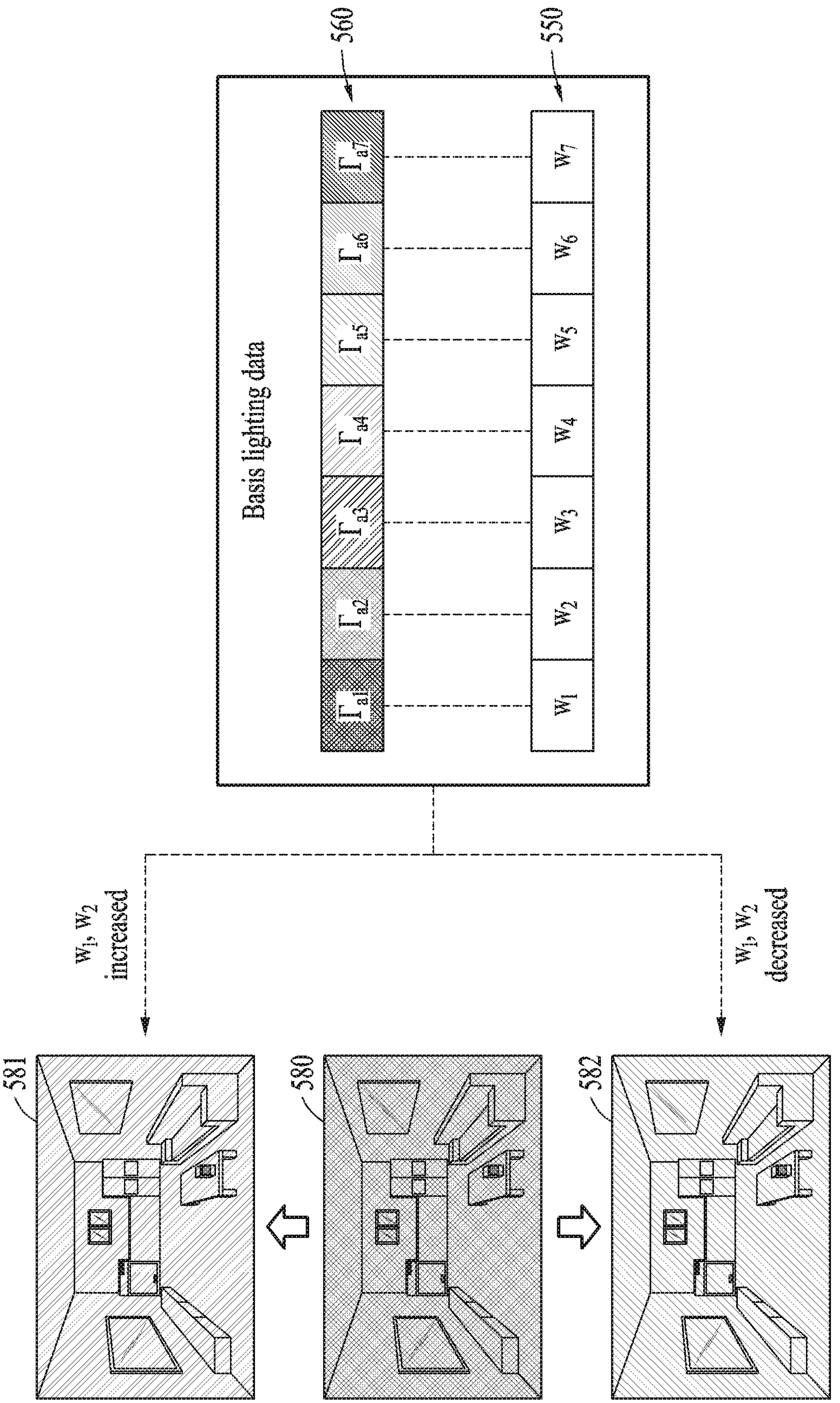

FIGS. 4 and 5 illustrate examples of tuning correction lighting data for an input image.

FIG. 4 illustrates an example of tuning the correction lighting data for the input image by retraining a first neural network and a second neural network.

In an example, the image processing device may tune the correction lighting data for the input image by retraining the first neural network and the second neural network. More specifically, the image processing device may retrain the first neural network and the second neural network and tune the correction lighting data by inputting the input image to the retrained first neural network and the retrained second neural network.

In an example, the image processing device may tune the correction lighting data for the input image by changing a total loss $L_{tot}$. More specifically, in operation 411, the image processing device, to tune the correction lighting data for the input image, may change the total loss $L_{tot}$ by changing one or more of a correction parameter $\lambda_c$ applied to a correction loss $L_{correct}$, a weight adjustment parameter $\lambda_s$ applied to a weight loss $L_{weight}$, and a color distribution adjustment function $L_a$ for calculating a color loss $L_{color}$. In operation 421, the image processing device may retrain the first neural network and the second neural network, based on the changed total loss $L_{tot}$.

For example, the image processing device may adjust the correction lighting estimation accuracy of the correction lighting data for the input image by changing the correction parameter $\lambda_c$ applied to the correction loss $L_{correct}$. The image processing device may increase the correction lighting estimation accuracy of the correction lighting data for the input image by increasing the correction parameter $\lambda_c$ applied to the correction loss $L_{correct}$ and may decrease the correction lighting estimation accuracy of the correction lighting data for the input image by decreasing the correction parameter $\lambda_c$.

In another example, the image processing device may adjust sparsity between weights included in a lighting weight corresponding to the input image by changing the weight adjustment parameter $\lambda_s$ applied to the weight loss $L_{weight}$. The image processing device may decrease the sparsity between the weights by increasing the weight adjustment parameter As applied to the weight loss $L_{weight}$. The weights included in the lighting weight may converge to ‘0’ as the weight adjustment parameter As increases. The image processing device may increase the sparsity between the weights by decreasing the weight adjustment parameter $\lambda_s$ applied to the weight loss $L_{weight}$. As the weight adjustment parameter $\lambda_s$ decreases, one of the weights included in the lighting weight may converge to ‘1’ and the second weights may converge to ‘0’.

In another example, the image processing device may adjust a distribution of a certain color by changing the color distribution adjustment functions $L_a$. For example, the image processing device may increase a weight for a red color component by changing the color distribution adjustment function $L_a$. In this case, the image processing device may increase correction lighting estimation accuracy of the red color component of the correction lighting data by the changed color distribution adjustment function $L_a$.

In an example, the image processing device tunes the correction lighting data for the input image by changing ground truth correction lighting data mapped to a training image. More specifically, in operation 412, the image processing device, to tune the correction lighting data for the input image, may change the ground truth correction lighting data mapped to the training image. In operation 422, the image processing device may retrain the first neural network and the second neural network, based on the changed ground truth correction lighting data. For example, the image processing device may increase a red color component value of the pieces of ground truth correction lighting data respectively mapped to a plurality of training images. In this case, a change of the red color component value of the pieces of ground truth correction lighting data may increase a value of the red color component of the correction lighting data for the input image.

In an example, the image processing device tunes the correction lighting data for the input image by changing basis lighting data preset corresponding to the input image. More specifically, in operation 413, the image processing device, to tune the correction lighting data for the input image, may change the basis lighting data preset corresponding to the input image to other basis lighting data. In operation 423, the image processing device may retrain the first neural network and the second neural network, based on the changed basis lighting data.

For example, the image processing device may select the second basis lighting data including a blue component value that is greater than a blue component value included in the basis lighting data preset corresponding to the input image. The image processing device may retrain the first neural network and the second neural network by using the selected other basis lighting data, and a blue component value of the tuned correction lighting data for the input image may increase compared to a blue component value of the correction lighting data before tuned.

In operation 430, the image processing device may input the input image to the retrained first neural network and the retrained second neural network and obtain the tuned correction lighting data.

FIG. 5 illustrates an example of tuning the correction lighting data for the input image by changing a lighting weight.

The image processing device may change a lighting weight 550 by changing at least one weight of a plurality of weights included in the lighting weight 550 generated corresponding to the input image and may tune the correction lighting data for the input image by applying the changed lighting weight 550 to basis lighting data 560 preset corresponding to the input image.

FIG. 5 illustrates an example of the lighting weight 550 including seven weights (e.g., $w_1$, $w_2$, $w_7$) and the basis lighting data 560 including seven vectors (e.g., $\Gamma_{a1}$, $\Gamma_{a2}$, . . . , $\Gamma_{a7}$). An image 580 may be an image white balanced with the correction lighting data before being tuned by being applied to the input image. Images 581 and 582 may be images white balanced with the tuned correction lighting data being applied to the input image. For example, the tuned correction lighting data applied to the image 581 may be correction lighting data tuned by increasing weights (e.g., $w_1$, $w_2$) corresponding to a red-based color of the plurality of weights (e.g., $w_1$, $w_2$, $w_7$) included in the lighting weight 550. The tuned correction lighting data applied to the image 582 may be correction lighting data tuned by decreasing the weights (e.g., $w_1$, $w_2$) corresponding to a red-based color of the plurality of weights (e.g., $w_1$, $w_2$, . . . , $w_7$) included in the lighting weight 550. A red color value of the correction lighting data applied to the image 581 may be greater than a red color value of the correction lighting data applied to the image 580. The red color value of the correction lighting data applied to the image 580 may be greater than a red color value of the correction lighting data applied to the image 582.

Figure 6:
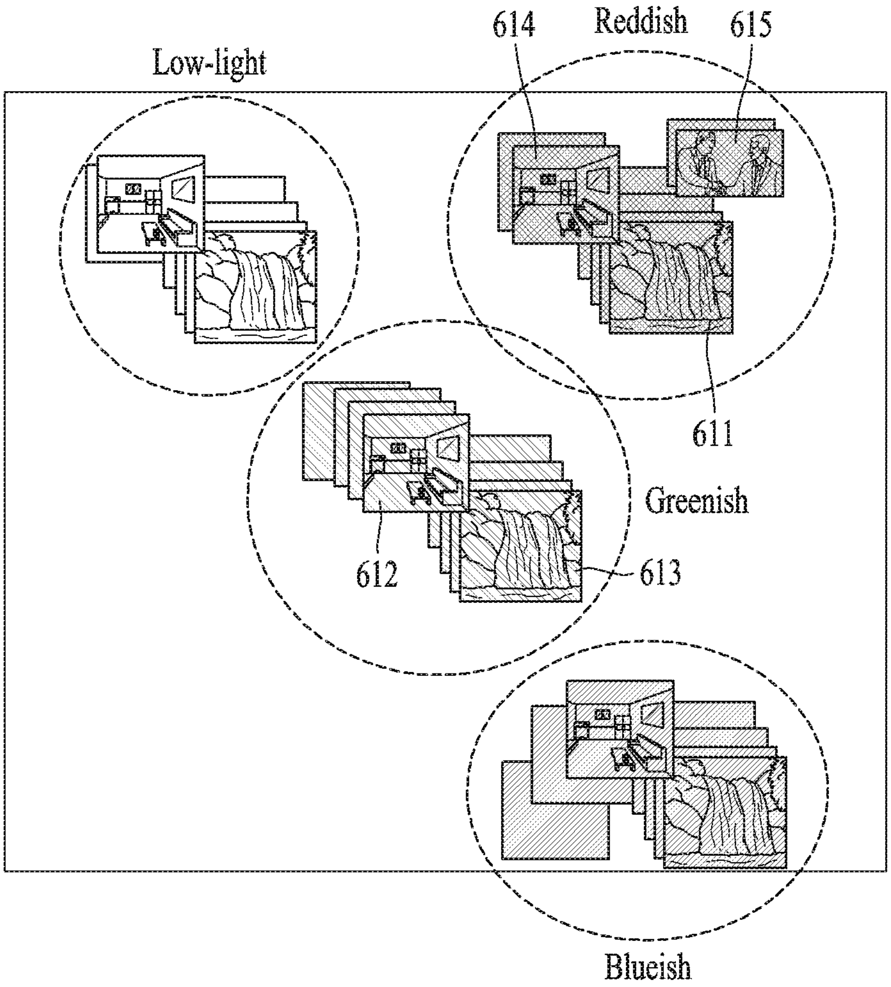
FIG. 6 illustrates an example of jointly tuning pieces of correction lighting data.

FIG. 6 illustrates an example of jointly tuning pieces of correction lighting data.

The image processing device may receive and/or store a plurality of input images and perform white balancing on each of the plurality of input images. In this case, the image processing device may tune pieces of correction lighting data respectively corresponding to two or more input images jointly by clustering the two or more input images.

The image processing device may extract another input image that has embedding data similar to the embedding data of an input image 611 from the plurality of input images. For example, the image processing device may generate pieces of embedding data respectively corresponding to the plurality of input images. The image processing device may project the pieces of embedding data to an n-dimensional space and may calculate the position of each of the pieces of embedding data in the n-dimensional space. The image processing device may determine two pieces of embedding data are similar to each other based on that they are close to each other in the n-dimensional space.

For example, the image processing device may determine similar pieces of embedding data by using k-means clustering. FIG. 6 illustrates input images respectively corresponding to pieces of embedding data in the position of each of the pieces of embedding data in a 2D space by projecting the pieces of embedding data respectively corresponding to the input images (e.g., the input image 611, an input image 612, an input image 613, etc.) to the 2D space. Referring to FIG. 6, for example, the image processing device may identify another image that has similar embedding data to that of the input image 611. For example, this can be another input image 614 or image 615.

In an example, the image processing device may extract the second input image 614, of which embedding data is similar to the embedding data of the input image 611 and may tune pieces of correction lighting data respectively corresponding to the input image 611 and the second input image 614. In an example, when retraining the first neural network and the second neural network to tune the correction lighting data for the second input image 614, the image processing device may tune the correction lighting data for the second input image 614 by inputting the second input image 614 to the retrained first neural network and the retrained second neural network.

For example, to tune the correction lighting data for the input image 611, the image processing device may change a total loss $L_{tot}$, and based on the changed total loss $L_{tot}$, may retrain the first neural network and the second neural network. In another example, the image processing device may retrain the first neural network and the second neural network by changing ground truth correction lighting data mapped to a training image. In this example, the image processing device may tune the correction lighting data for another input image 614 by inputting another input image 614 to the first neural network and the second neural network that are retrained to tune the correction lighting data for the input image 611 without the need to separately train the first neural network and the second neural network when generating the correction lighting data for another input image 614.

Figure 7:
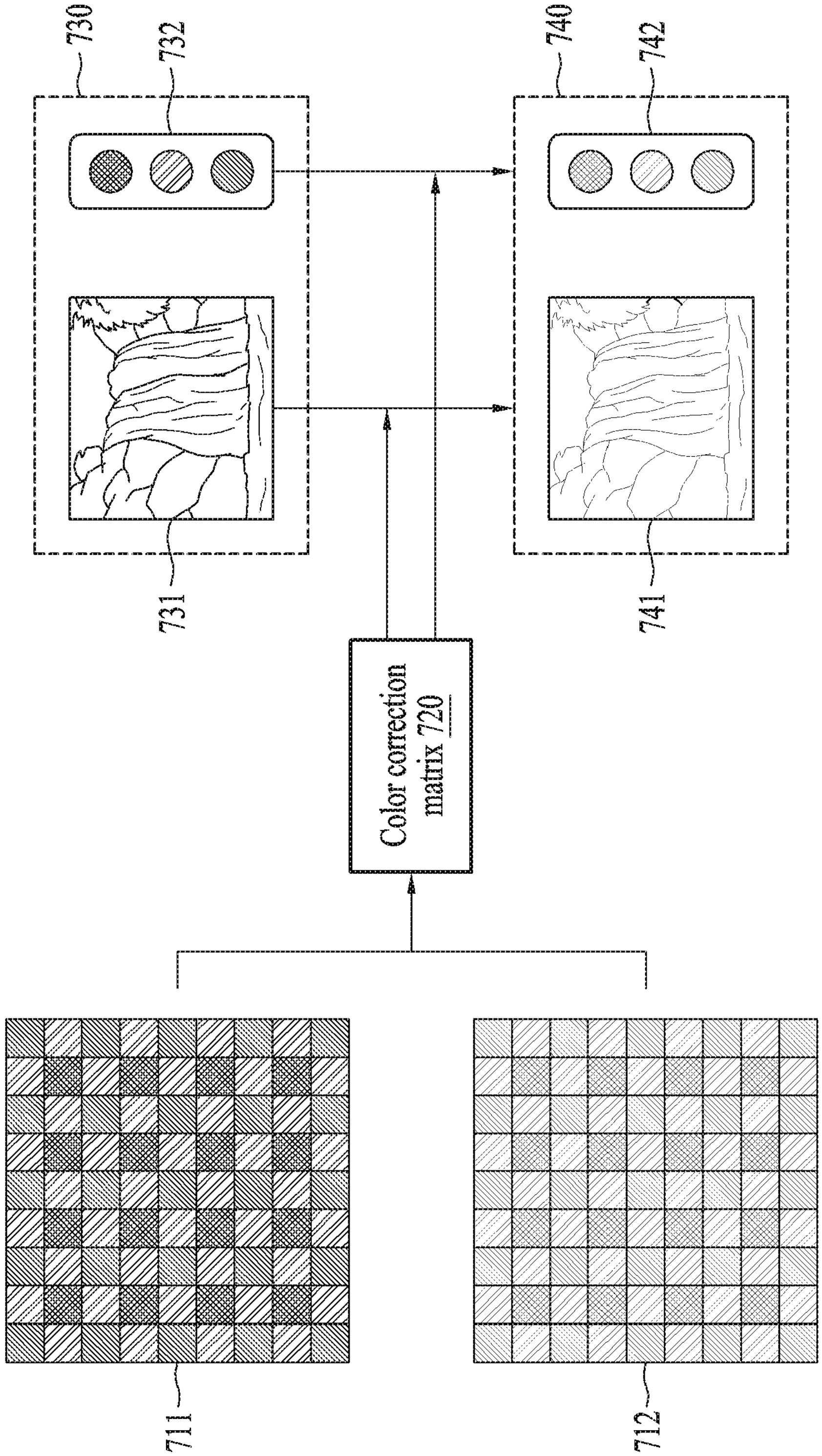
FIG. 7 illustrates an example of calculating correction lighting data when a feature of the input image changes.

FIG. 7 illustrates an example of calculating correction lighting data for an input image when a feature of the input image changes.

The image processing device may receive images from a capturing device and may store pieces of training data to perform white balancing on each image received from the capturing device. In some cases, a color space of an image received from the capturing device to the image processing device may change when a sensor and/or an image signal processor (ISP) of the capturing device are/is changed. In addition, a color space of an image may also change when the capturing device is changed to another capturing device from which the image processing device receives the image. A color space may be a space indicating a color including three color components, that is, red, green, and blue, and a color value of each of red, green, and blue may vary depending on each color space.

In an example, the image processing device may perform white balancing on an image including a changed color space by using existing training data (e.g., training data 730). The image processing device may calculate a color correction matrix 720 from a first raw image 711 that is captured in a first color space and a second raw image 712 that is captured in a second color space when a color space of an image received from a capturing device changes from the first color space to the second color space. For example, the image processing device may calculate a 3×3 color correction matrix by using a pseudo-inverse method, based on a 3×1 first matrix including a red color value, a green color value, and a blue color value in the first color space and a 3×1 second matrix including a red color value, a green color value, and a blue color value in the second color space. In other words, the color correction matrix may be a matrix converted from the first matrix to the second matrix. The image processing device may change training data based on the second color space by applying the color correction matrix 720 to a training image (e.g., a training image 731) included in the existing training data (e.g., the training data 730) and ground truth correction lighting data (e.g., ground truth correction lighting data 732) mapped to the training image. Referring to FIG. 7, for example, the image processing device may obtain a changed training image 741 by applying the color correction matrix 720 to the training image 731, obtain changed ground truth correction lighting data 742 by applying the color correction matrix 720 to the ground truth correction lighting data 732, and generate changed training data 740 including the changed training image 741 and the changed ground truth correction lighting data 742. The image processing device may retrain the first neural network and the second neural network by using the changed training data 740 and generate the correction lighting data for the input image by inputting an input image corresponding to the second color space to the first neural network and the second neural network that is retrained by using the changed training data 740.

Figure 8:
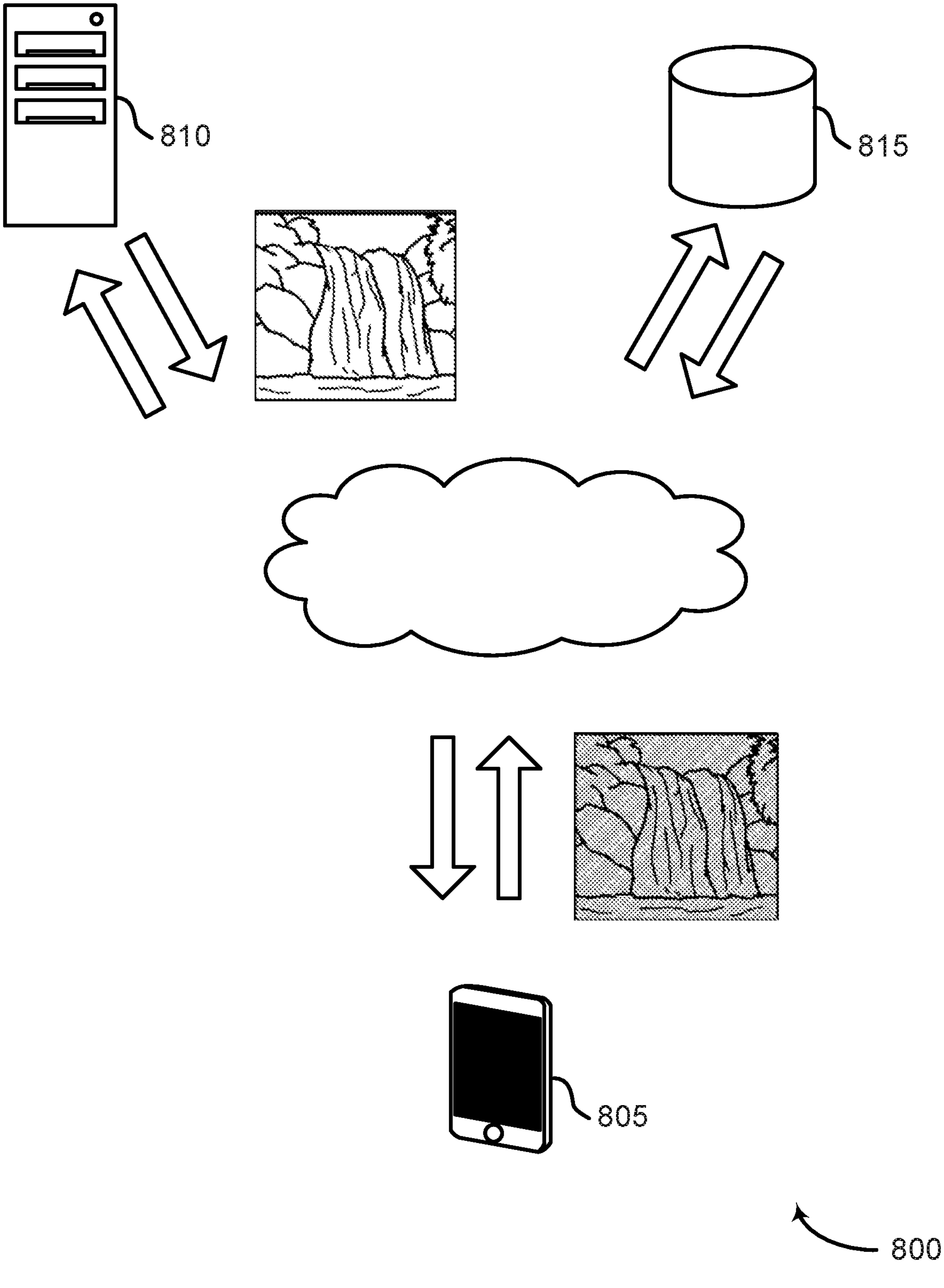
FIG. 8 illustrates an image processing system.

FIG. 8 illustrates an image processing system 800. The image processing system 800 may include a capturing device 805, an image processing device 810, and a database 815. The image processing system 800 may be capable of generating and applying one or more neural networks capable performing multiple image processing tasks on an image processing device 810 with limited hardware resources (e.g., limited processor or memory resources). The image processing device 810 may be an example of the image processing device described with reference to FIGS. 1-7, and may perform the multi-task methods described herein.

In some examples, the capturing device 805 may be a digital camera, surveillance camera, webcam, etc. The capture device may be used to capture the raw data of an image and send that captured image to the image processing device as the input image.

In some examples, the image processing device 810 may be a computer or a smartphone. The image processing device 810 may also be a digital camera, surveillance camera, webcam, or any other suitable apparatus that has a processor for performing image processing.

A processor may be an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special purpose components for modem processing, baseband processing, digital signal processing, or transmission processing.

The processor may execute software. Software may include code to implement aspects of the present disclosure. Software may be stored in a non-transitory computer-readable medium such as memory or other system memory. In some cases, the software may not be directly executable by the processor but may cause a computer (e.g., when compiled and executed) to perform functions described herein.

The memory may be a volatile memory or a non-volatile memory and may store data related to the multi-task processing method described above with reference to FIGS. 1 to 6. Examples of a memory device include flash memory, random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

The image processing device 810 may include or be connected to one or more sensors. For example, the image processing device 810 may include or be connected to the capturing device 805 for capturing an input image. The image processing device 810 may include or be connected to auxiliary sensors including a photoresistor sensor or an ambient light sensor for sensing ambient light.

In one example, image processing device 810 may generate predicted lighting data and embedding data corresponding to a captured input image using a first neural network and generate correction lighting data using a second neural network. The image processing device 810 may generate white-balanced image using the correction lighting data, and may operate one or more neural networks for performing multiple image processing tasks. The neural networks may be trained at another device, such as on a server 810. In some cases, parameters for one or more neural networks are trained on the server 810 and transmitted to the image processing device 810. In other examples, parameters for one or more neural networks are trained prior to manufacturing the image processing device 810.

In some cases, the image processing device 810 is implemented on a server. The server provides one or more functions to devices/users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose image processing device, a personal computer, a laptop computer, a mainframe computer, a supercomputer, or any other suitable processing apparatus.

In some cases, training data (e.g., training images for one or more image processing tasks) for training the one or more machine learning models is stored at the database 815. A database is an organized collection of data. For example, a database stores data in a specified format known as a schema. A database may be structured as a single database, a distributed database, multiple distributed databases, or an emergency backup database. In some cases, a database controller may manage data storage and processing in a database. In some cases, a user interacts with database controller. In other cases, a database controller may operate automatically without user interaction.

Figure 9:
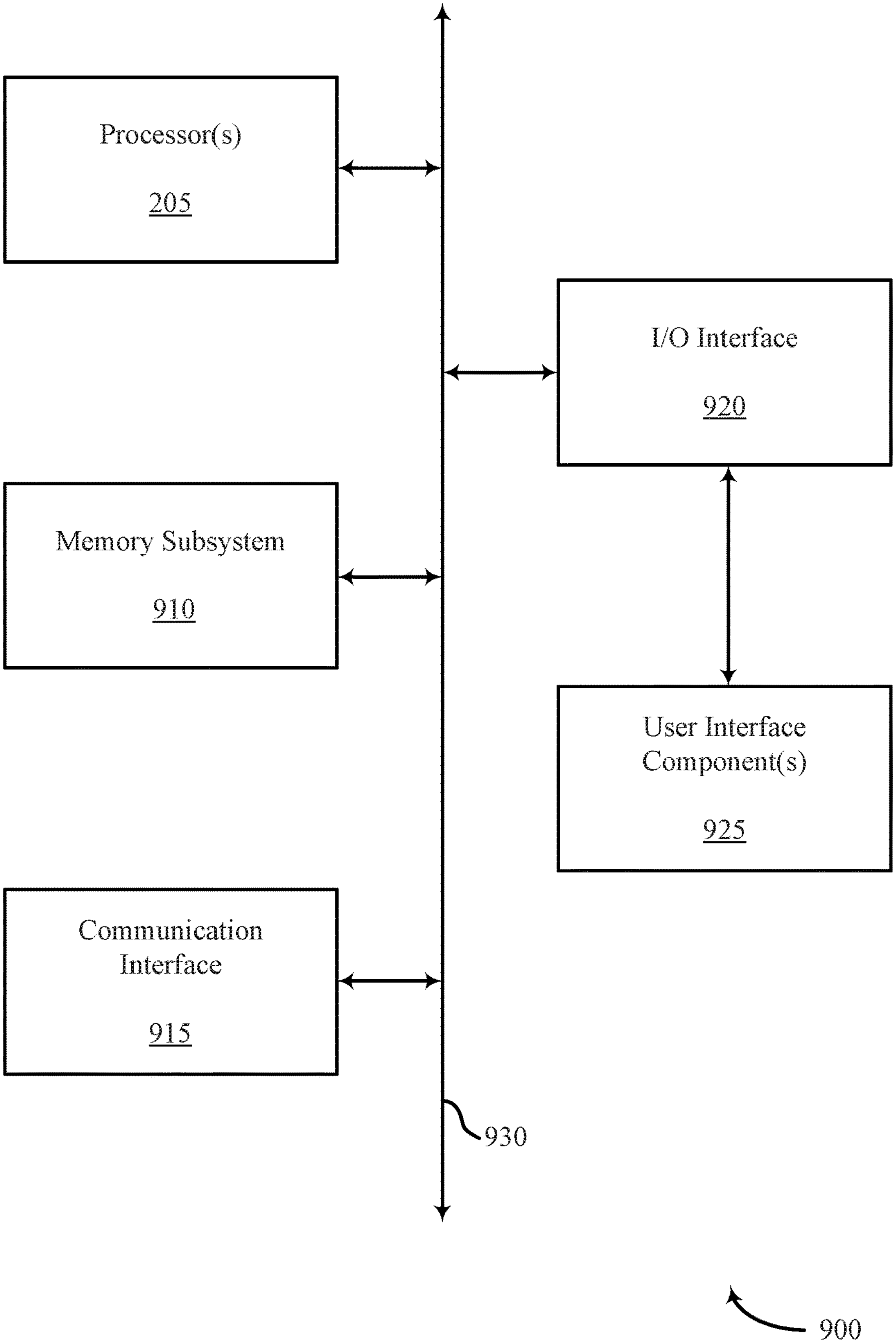
FIG. 9 illustrates an image processing device.

FIG. 9 illustrates a computing device 900. In one aspect, computing device 900 includes processor(s) 905, memory subsystem 910, communication interface 915, I/O interface 920, user interface component(s) 925, and channel 930.

In some embodiments, computing device 900 is an example of, or includes aspects of, image processing device 810 of FIG. 8. In some embodiments, computing device 900 includes one or more processors 905 that can execute instructions stored in memory subsystem 910 to perform color correction and white balancing as described herein.

According to some aspects, computing device 900 includes one or more processors 905. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 910 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 915 operates at a boundary between communicating entities (such as computing device 900, one or more user devices, a cloud, and one or more databases) and channel 930 and can record and process communications. In some cases, communication interface 915 is provided to enable a processing system coupled to a transceiver (e.g., a transmitter and/or a receiver). In some examples, the transceiver is configured to transmit (or send) and receive signals for a communications device via an antenna.

According to some aspects, I/O interface 920 is controlled by an I/O controller to manage input and output signals for computing device 900. In some cases, I/O interface 920 manages peripherals not integrated into computing device 900. In some cases, I/O interface 920 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 920 or via hardware components controlled by the I/O controller.

According to some aspects, user interface component(s) 925 enable a user to interact with computing device 900. In some cases, user interface component(s) 925 include an audio device, such as an external speaker system, an external display device such as a display screen, an input device (e.g., a remote control device interfaced with a user interface directly or through the I/O controller), or a combination thereof. In some cases, user interface component(s) 925 include a GUI.

Figure 10:
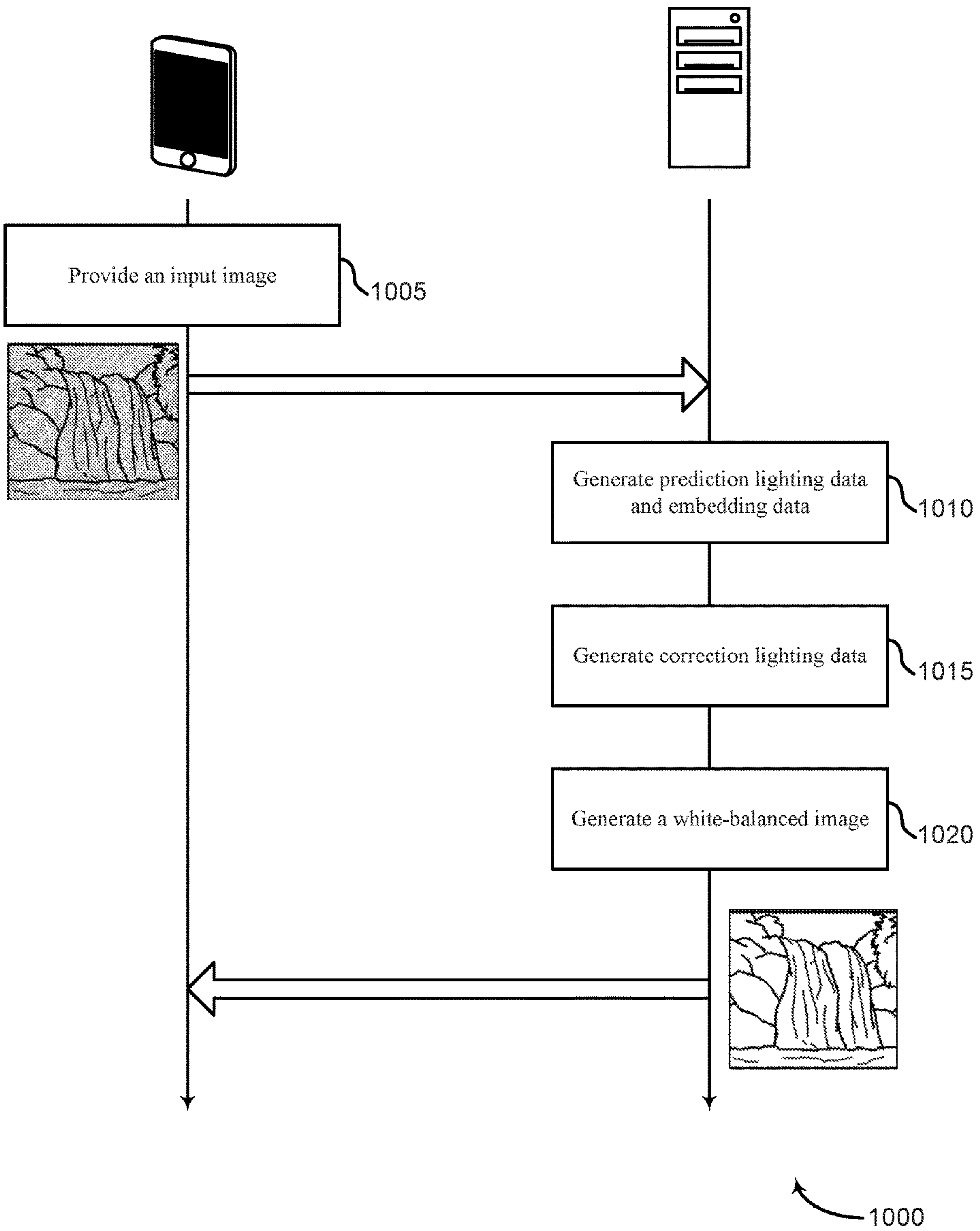
FIG. 10 illustrates a method of white balancing.

FIG. 10 illustrates a method of white balancing. For example, aspects of an image processing process 900 may be performed by the image processing system 800 and or an image processing device 900 described with reference to FIGS. 8 and 9.

At step 1005, an input image is provided by a capturing device (e.g., a camera) to the image processing device. In some cases, the captured image may have incorrect or undesirable coloring based on the lighting conditions when the image was captured.

At step 1010, the image processing device generates predicted lighting data and embedding data corresponding to a captured input image. For example, the server may train a first neural network to generate predicted lighting data and embedding data using an input image.

At step 1015, the image processing device generates correction lighting data. For example, the server may train a second neural network to generate correction lighting data based on the predicted lighting data, embedding data, and sensor data, where the sensor data measures the ambient light when the input image was captured.

At step 1020, the image processing device generates a corrected image. For example, the server may apply the correction lighting data to the input image to obtain a white-balanced image that corrects the undesired coloring of the original input image.

The present description describes additional aspects of the methods, apparatuses, and/or systems related to the disclosure. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

Accordingly, the features described herein may be embodied in different forms and are not to be construed as being limited to the example embodiments described herein. Rather, the example embodiments described herein have been provided merely to illustrate some of the many possible ways of implementing the methods, apparatuses, and/or systems described herein that will be apparent after an understanding of the disclosure of this application. As used herein, "A or B," "at least one of A and B," "at least one of A or B," "A, B, or C," "at least one of A, B, and C," and "A, B, or C," each of which may include any one of the items listed together in the corresponding one of the phrases, or all possible combinations thereof. Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component. Throughout the disclosure, when an element is described as "connected to" or "coupled to" another element, it may be directly "connected to" or "coupled to" the other element, or there may be one or more other elements intervening therebetween. In contrast, when an element is described as "directly connected to" or "directly coupled to" another element, there may be no other elements intervening therebetween.

The terminology used herein is for describing various example embodiments only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, description of structures or functions that are thereby known after an understanding of the disclosure of the present application will be omitted when it is deemed that such description will cause ambiguous interpretation of the example embodiments. Example embodiments are described with reference to the accompanying drawings, and like reference numerals in the drawings refer to like elements throughout.

The examples described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data by execution of the software. For simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially provided and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), RAM, flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A method, performed by at least one processor, of correcting lighting of an input image, the method comprising:

generating, using a first neural network, predicted lighting data corresponding to the lighting of the input image and embedding data corresponding to a feature of the input image, wherein the predicted lighting data is represented as a three-dimensional (3D) vector, with three components representing red color value, green color value, and blue color value of the lighting applied to content of the input image;

generating, using a second neural network, a lighting weight corresponding to the input image based on the predicted lighting data, the embedding data, and sensor data, wherein the sensor data indicates an amount of light measured by a sensor, wherein the lighting weight is represented as a single vector including a plurality of lighting weight values; and generating correction lighting data for the input image by applying the lighting weight to preset basis lighting data corresponding to the input image, wherein the preset basis lighting data is determined based on a color temperature of light emitted from a light source or a type of a capturing device that captured the input image, wherein the preset basis lighting data includes a plurality of vectors, and a number of vectors included in the basis lighting data matches the number of lighting weight values of the lighting weight vector, and the generating correction lighting data comprises:

determining a first lighting correction vector by calculating a weighted sum between the plurality of vectors of the preset basis lighting data and the plurality of lighting weight values of the lighting weight; and generating the correction lighting data for the input image based on the first lighting correction vector.

2. The method of claim 1, further comprising:

generating a white-balanced image by applying the generated correction lighting data to the input image.

3. The method of claim 1, wherein the generating the correction lighting data for the input image further comprises:

obtaining a first vector by multiplying the predicted lighting data by a weight;

obtaining a second vector by adding the first vector to a constant;

obtaining a third vector by dividing the first lighting correction vector by the second vector; and obtaining the second lighting correction vector by applying a normalization function to the third vector, and determining the second lighting correction vector as the correction lighting data.

4. The method of claim 1, further comprising:

calculating a total loss based on training data, the total loss comprising an estimation loss, a correction loss, a weight loss, and a color loss; and training the first neural network and the second neural network together based on the calculated total loss, wherein the calculating the total loss comprises:

calculating the estimation loss is related to lighting applied to an image, based on a first distance-based loss function value of temporary predicted lighting data and ground truth predicted lighting data;

calculating the correction loss is related to correction of the lighting applied to the image, based on a second distance-based loss function value of the temporary correction lighting data and ground truth correction lighting data;

calculating the weight loss is related to weight sparsity, based on sum of light weight values included in the temporary lighting weight; and calculating the color loss is related to adjustment of a color distribution, based on color distribution adjustment function value of temporary correction lighting data and ground truth correction lighting data.

5. The method of claim 4, wherein the training the first neural network and the second neural network together comprises:

inputting a training image of the training data to the first neural network and generating temporary predicted lighting data and temporary embedding data;

inputting the generated temporary predicted lighting data, the generated temporary embedding data, and the sensor data to the second neural network and generating a temporary lighting weight;

generating temporary correction lighting data by applying the generated temporary lighting weight to the preset basis lighting data; and calculating the total loss based on the generated temporary predicted lighting data, the generated temporary lighting weight, and the generated temporary correction lighting data.

6. The method of claim 5, wherein the calculating the total loss comprises:

calculating an estimated loss based on the generated temporary predicted lighting data and ground truth predicted lighting data calculated from the training image;

calculating a correction loss and a color loss based on the generated temporary correction lighting data and ground truth correction lighting data mapped to the training image; and calculating a weight loss based on a sum of weights of the generated temporary lighting weight.

7. The method of claim 6, further comprising:

tuning the correction lighting data for the input image in response to retraining the first neural network and the second neural network.

8. The method of claim 7, wherein the tuning the correction lighting data for the input image comprises:

changing the total loss in response to changing one or more of a correction parameter applied to the correction loss, a weight adjustment parameter applied to the weight loss, and a color distribution adjustment function for calculating the color loss, and based on the changed total loss, retraining the first neural network and the second neural network.

9. The method of claim 7, wherein the tuning the correction lighting data for the input image further comprises:

retraining the first neural network and the second neural network in response to changing the ground truth correction lighting data mapped to the training image.

10. The method of claim 7, wherein the tuning the correction lighting data for the input image further comprises:

retraining the first neural network and the second neural network in response to changing the preset basis lighting data preset corresponding to the input image to other preset basis lighting data.

11. The method of claim 6, further comprising:

changing at least one weight of a plurality of weights of the lighting weight generated corresponding to the input image and changing the lighting weight; and tuning the correction lighting data for the input image in response to applying the changed lighting weight to the preset basis lighting data.

12. The method of claim 1, further comprising:

generating pieces of embedding data respectively corresponding to a plurality of input images;

extracting, from the plurality of input images, another input image comprising embedding data that is similar to the embedding data corresponding to the feature of the input image; and tuning pieces of correction lighting data respectively corresponding to the input image and the another input image together.

13. The method of claim 12, wherein the tuning the pieces of correction lighting data respectively corresponding to the input image and the another input image together comprises:

inputting the another input image to a retrained first neural network and a retrained second neural network and tuning the correction lighting data of the another input image when retraining the first neural network and the second neural network to tune the correction lighting data of the input image.

14. The method of claim 1, further comprising:

calculating a color correction matrix from a first raw image captured in a first color space and a second raw image captured in a second color space when a color space of an image received from a capturing device changes from the first color space to the second color space;

changing training data by applying the calculated color correction matrix to a training image of the training data and ground truth correction lighting data mapped to the training image; and retraining the first neural network and the second neural network based on the changed training data.

15. An image processing device comprising:

a communicator configured to receive an input image; and a processor configured to input the input image to a first neural network and generate predicted lighting data corresponding to lighting of the input image and embedding data corresponding to a feature of the input image, wherein the predicted lighting data is represented as a three-dimensional (3D) vector, with three components representing red color value, green color value, and blue color value of the lighting applied to content of the input image, input the generated predicted lighting data, the generated embedding data, and sensor data to a second neural network and generate a lighting weight corresponding to the input image, wherein the sensor data indicates an amount of light measured by a sensor, wherein the lighting weight is represented as a single vector including a plurality of lighting weight values, and generate correction lighting data for the input image in response to applying the generated lighting weight to preset basis lighting data corresponding to the input image, wherein the preset basis lighting data is determined based on a color temperature of light emitted from a light source or a type of a capturing device that captured the input image, wherein the preset basis lighting data includes a plurality of vectors, and a number of vectors included in the basis lighting data matches the number of lighting weight values of the lighting weight vector, wherein the processor is further configured to:

determine a first lighting correction vector by calculating a weighted sum between the plurality of vectors of the preset basis lighting data and the plurality of lighting weight values of the lighting weight; and generate the correction lighting data for the input image based on the first lighting correction vector.

16. The image processing device of claim 15, wherein the processor is further configured to:

calculate a total loss comprising an estimation loss, a correction loss, a weight loss, and a color loss; and train the first neural network and the second neural network together based on the calculated total loss, wherein the processor is further configured to:

calculate the estimation loss is related to lighting applied to an image, based on a first distance-based loss function value of temporary predicted lighting data and ground truth predicted lighting data;

calculate the correction loss is related to correction of the lighting applied to the image, based on a second distance-based loss function value of the temporary correction lighting data and ground truth correction lighting data;

calculate the weight loss is related to weight sparsity, based on sum of light weight values included in the temporary lighting weight; and calculate the color loss is related to adjustment of a color distribution, based on color distribution adjustment function value of temporary correction lighting data and ground truth correction lighting data.

17. The image processing device of claim 16, wherein the processor is further configured to:

retrain the first neural network and the second neural network, and in response to retraining the first neural network and the second neural network, tune the correction lighting data for the input image.

18. The image processing device of claim 17, wherein the processor is further configured to:

change the total loss in response to changing one or more of a correction parameter applied to the correction loss, a weight adjustment parameter applied to the weight loss, and a color distribution adjustment function for calculating the color loss, and based on the changed total loss, retrain the first neural network and the second neural network.

* * * * *